United States Patent
Weymouth, Jr.

(10) Patent No.: US 8,153,035 B2
(45) Date of Patent: Apr. 10, 2012

(54) PROGRAMMABLE WETTING CONTROLLER

(75) Inventor: Russell F. Weymouth, Jr., Charlton, MA (US)

(73) Assignee: Gentex Optics, Inc., Simpson, PA (US)

( * ) Notice: Subject to any disclaimer, the term of this patent is extended or adjusted under 35 U.S.C. 154(b) by 1016 days.

(21) Appl. No.: 11/880,751

(22) Filed: Jul. 24, 2007

(65) Prior Publication Data
US 2009/0026640 A1    Jan. 29, 2009

(51) Int. Cl.
B29D 11/00    (2006.01)
(52) U.S. Cl. ......... 264/2.6; 118/697; 118/705; 264/129; 425/808; 427/162; 427/164
(58) Field of Classification Search ................... 264/1.1, 264/2.6, 40.1, 40.7, 299, 305, 129, 132; 118/665, 118/668, 696, 697, 705; 425/808, 445; 427/163, 427/162, 164
See application file for complete search history.

(56) References Cited

U.S. PATENT DOCUMENTS

| | | |
|---|---|---|
| 3,956,540 A | 5/1976 | Laliberte et al. |
| 4,084,021 A | 4/1978 | Sandvig |
| 4,245,991 A | 1/1981 | Haddad et al. |
| 4,267,208 A | 5/1981 | Ireland |
| 4,345,546 A | 8/1982 | Weber |
| 4,353,934 A | 10/1982 | Nakashima et al. |
| 4,438,159 A | 3/1984 | Weber |
| 4,455,322 A | 6/1984 | Weber |
| 4,476,162 A | 10/1984 | Ireland |
| 4,544,572 A | 10/1985 | Sandvig et al. |
| 4,710,199 A | 12/1987 | Suter |
| 4,915,986 A | 4/1990 | Elias et al. |
| 5,052,337 A | 10/1991 | Talcott et al. |
| 5,096,457 A | 3/1992 | Nakagawa et al. |
| 5,153,027 A | 10/1992 | Spagnoli |
| 5,164,228 A | 11/1992 | Peralta et al. |
| 5,201,955 A | 4/1993 | Chika et al. |
| 5,334,246 A | 8/1994 | Pietrzykowsk, Jr. et al. |
| 5,335,187 A | 8/1994 | Koizumi et al. |
| 5,514,214 A | 5/1996 | Joel et al. |
| 5,718,849 A | 2/1998 | Maus et al. |
| 5,820,673 A | 10/1998 | Sentilles et al. |
| 6,024,902 A * | 2/2000 | Maus et al. ................. 264/40.5 |
| 6,039,806 A | 3/2000 | Zhou et al. |
| 6,128,087 A | 10/2000 | Meredith, Jr. et al. |
| 6,129,042 A | 10/2000 | Smith et al. |
| 6,270,850 B1 | 8/2001 | Cai et al. |

(Continued)

FOREIGN PATENT DOCUMENTS

EP    0102847 A1    3/1984

(Continued)

Primary Examiner — Mathieu D. Vargot
(74) Attorney, Agent, or Firm — Keusey & Associates, P.C.

(57) ABSTRACT

An apparatus for wetting and coating ophthalmic lenses having a tank with a cleaning or coating solution and a handling system for sequentially moving a lens and the solution in relation to each other, to wet the lens. A master control module is coupled to the handling system and configured execution a wetting profile. The wetting profile moves the lens to obtain a generally consistent lens surface wetting speed so that the lens coating has a more uniform thickness. According to a method, lenses are wetted in a liquid bath. The lens is placed in a handling system which moves the lens with respect to the bath according to a wetting profile. The wetting profile is based on the incremental vertical lens surface slope with respect to the surface of the solution.

33 Claims, 5 Drawing Sheets

U.S. PATENT DOCUMENTS

| | | |
|---|---|---|
| 6,296,707 B1 | 10/2001 | Adamczyk et al. |
| 6,355,104 B1 | 3/2002 | Polster |
| 6,673,276 B1 | 1/2004 | Bos et al. |
| 6,743,486 B1 | 6/2004 | Miyazawa |
| 2003/0012872 A1 | 1/2003 | Qiu et al. |
| 2004/0096577 A1 | 5/2004 | Trinh et al. |
| 2005/0098098 A1 | 5/2005 | Biver et al. |
| 2005/0208212 A1 | 9/2005 | Jallouli et al. |
| 2006/0032438 A1 | 2/2006 | Biver et al. |
| 2006/0079388 A1 | 4/2006 | Koenig et al. |

FOREIGN PATENT DOCUMENTS

| | | |
|---|---|---|
| EP | 1524099 A2 | 4/2005 |
| GB | 1113961 | 5/1968 |
| GB | 2159441 | 12/1985 |
| JP | 53140380 | 12/1978 |
| JP | 59013201 | 1/1984 |
| WO | WO0220176 A1 | 3/2002 |
| WO | WO2004101261 A1 | 11/2004 |
| WO | WO2006/117205 | 11/2006 |

* cited by examiner

PROGRAMMABLE WETTING CONTROLLER

TECHNICAL FIELD

The present principles generally relate to optical coating systems, and more particularly, to a system and method for the automated surface wetting and quality control of optical lens coatings.

BACKGROUND

Optical lenses used for eyeglasses, sunglasses, cameras, binoculars and the like increasingly require very high standards for geometry and mold replication. Frequently, these lenses are molded from durable optical grade plastics, and commonly have coatings applied to increase the usability and durability of the lens. For instance, scratch resistant coating, tints, polarizing coatings and laser protection coatings are commonly applied to optical lenses. These optical lens coatings may be applied directly to the surface of the lens as a liquid.

However, liquid lens coatings are subject to many factors that can affect the quality of the lens coating, and ultimately, the quality of the optical lens. It is not uncommon to have issues with dust, coating thickness and uniformity or other similar coating imperfections introduced during the coating process. Additionally, excessive handling of newly coated lenses and inconsistent timing between coating steps may lead to additional coating flaws and other inconsistencies in the finished lenses.

An additional issue arises when changes in coating uniformity are detected, even before the overall coating quality falls out of acceptable tolerances. The complete process of coating lenses may involve several coating steps, and may be followed by a curing and inspection process. The curing process allows the lens coatings to solidify after the final coating step. However, the time required for the curing process is such that new lenses must constantly be in process while other lenses are drying. Any detected defects in a finished lens will likely carry over to lenses that are coated after the flawed lens is inspected.

Furthermore, conditions in the coating process may gradually, over time, drift out of tolerance. The ability to detect defects before the defects fall out of tolerance requires analyzing defects trends as they develop. Prior art systems are generally open loop requiring the operator to take affirmative steps to adjust parameters within the coating process. Even over a short period of time, small defects if left unchecked, can lead to major problems. Even when the coating process if operating normally, contamination or molding defects can result in defective product.

U.S. Pat. No. 5,164,228, granted Nov. 18, 1992, to Peralta, et al., (hereinafter, Peralta) attempts to address some of these issues. Specifically, Peralta discloses an automated system for spin coating plastic ophthalmic lenses. However, Peralta does not make any provisions for automated inspection, feedback based on flaws in the coating process, or for automatically adjusting the timing between coating steps based on discovered coatings flaws. Furthermore, Peralta primarily focuses on indexing and tracking lenses in conjunction with the cold runners, or sprues, with which the lenses were molded.

What is needed is a system for coating lenses where each step of the coating process can be regulated and controlled. Preferably, this system would be automated, and allow for correction of defects through an automated process.

SUMMARY

The present principles are directed to a system and method for the automated wetting and quality control of optical lens coatings.

A system and method are presented for controlling the handling and inspection of the wetting and resulting coating of optical lenses. A manipulator places one or more lenses into one or more liquids held in monitored dipping vats in conformance with a wetting profile, where the wetting profile indicates the submersion acceleration and/or speed, the removal acceleration and/or speed of the lens from a liquid, the hold time of the lens in a liquid, and the temperature and/or other properties of each liquid.

An inspection system may be used to determine whether flaws, imperfections, or other irregularities in a lens coating occur, and a feedback system may be used to alter the wetting profile of subsequent lenses to correct for the flaws in lens coatings. The feedback system may also track each lens where the dipping protocol was altered, and the effectiveness of changes made to the wetting profile in correcting flaws in the lens coating.

The wetting of lenses may be accomplished by lowering each lens or lens set individually into each of a plurality of dipping tanks, or by raising each tank to cover a lens held stationary with respect to the dipping tanks. Each dipping tank may be full of fluid when the lens is brought into the volume of the dipping tank. Alternatively, the dipping tank may be empty after the lens is placed inside the dipping tank, and flooded and subsequently drained to achieve the desired wetting of a lens.

BRIEF DESCRIPTION OF THE DRAWINGS

The advantages, nature, and various additional features of the present principles will appear more fully upon consideration of the illustrative embodiments now to be described in detail in connection with accompanying drawings wherein.

It should be understood that the drawings are for purposes of illustrating the concepts of the present principles and are not necessarily the only possible configuration for illustrating the present principles.

DETAILED DESCRIPTION OF THE INVENTION

The present principles are directed to a system and method for the automated coating via wetting and quality control of optical lens coatings. In addition, the system provides for closed-loop feedback to quickly and automatically respond to defects, whether they arise from a molding problem or a coating problem. Thus, problems due to contamination in the molding process, can be identified before they effect the coatings.

It is to be understood that the present principles are described in terms of a system for coating optical lenses; however, the present principles are much broader and may include any wetting system. The present principles are described in terms of optical coatings; however, the concepts of the present principles may be extended to other coating systems.

It should be understood that the elements shown in the Figs. may be implemented in various forms of hardware, software or combinations thereof. Each element may be implemented in any combination of hardware and software, which may be executed on one or more appropriately programmed general-purpose computing devices. The general computing devices may include any combination of any known, or as yet undiscovered, processor, memory or input/output interfaces.

The functions of the various elements shown in the figures may be provided through the use of dedicated hardware as well as hardware capable of executing software in association with appropriate software. When provided by a processor or element, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any elements shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, but not limited to, for example, a combination of circuit elements that performs that function or software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. Any means that can provide those functionalities are equivalent to those shown herein.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended to aid the reader in understanding the present principles and the concepts contributed by the inventor to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, such equivalents may include both currently known equivalents as well as equivalents as yet undeveloped, including any elements developed in the future that perform the same function, regardless of structure.

Furthermore, any reference to a lens, lens coating, dipping tank or other module, step or apparatus is intended to included both singular references and plural references, e.g., wherein a reference to a lens may include multiple lenses mounted in a lens carrier or holder, or multiple lenses molded together into a single assembly or piece, and enabling the multiple lenses to be handled as one piece.

Figure 1A:
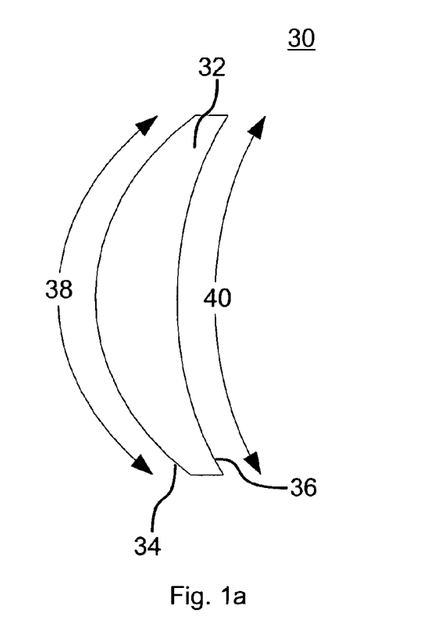
FIG. 1a is a cross sectional diagram of a lens having a high surface curvature.

Referring now in specific detail to the drawings in which like reference numerals identify similar or identical elements throughout the several views, and initially to FIG. 1a, a cross sectional diagram of an illustrative lens 32 having a relatively long surface curvature relative to the size is depicted.

Figure 1B:
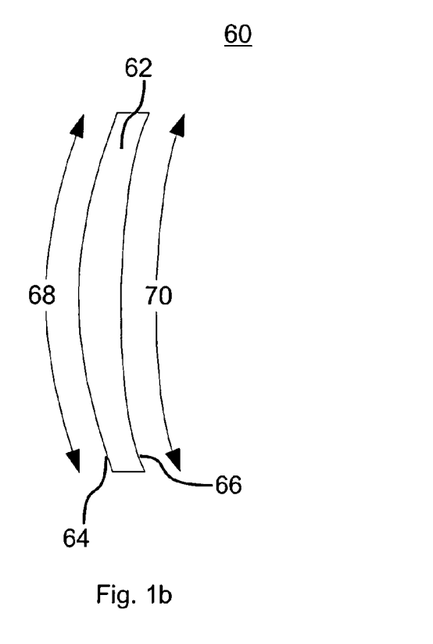
FIG. 1b is a cross sectional diagram of a lens having a low surface curvature.

As shown in FIG. 1a, a lens 32, may have a front surface 34 that has a much greater vertical surface length 38, or surface area, than that of a lens 62 having lesser curvature 68, FIG. 1b. Thus, while the vertical speed of the lens as a whole may remain constant, the relative vertical speed of each surface in relation to the surface of the liquid may vary according to the geometry of a particular lens. FIG. 1b shows a lens with far less curvature on the front surface 64 of the lens 62. Thus, the vertical surface length of the front surface 64 is shorter, and more uniform per vertical unit length, than that of the front surface 34 of lens 32 shown in FIG. 1a.

When a lens is dipped into, or withdrawn from, a liquid along the vertical axis a surface, such as the front surface 34 of the lens shown in FIG. 1a, the interface of the liquid surface and the lens surface will change more rapidly than the interface between the surface of lens with lesser curvature 60, FIG. 1b.

Where the lens is being withdrawn from a liquid, whether it is a primer, bath, coating, or other wetting substance, the speed of withdrawal of the lens is critical to the resulting coating quality. Ideally, the speed of withdrawal may vary as a function of the surface geometry of the lens. The surface tension, viscosity, adhesiveness, chemical make, and any other property of the liquid bath may affect how the liquid flows off of the various surfaces of a lens. In combination each lens' surface geometry, withdrawing a lens from a liquid bath too quickly may cause runs, ripples, sagging, overly thick coating areas, thin or dry areas, or other undesirable imperfections and flaws in the coating and/or surface of the lens. Additionally, features on the surface of the lens, such as bifocal adds, or the like, may affect the sheeting, or runoff of excess liquid on different lens surfaces. It should be noted that the various surface curvatures, surface features and bath liquid properties work in concert provide a unique wetting profile for each combination or properties.

For example, where a lens with a high curvature is removed from a liquid bath, liquid adhering to the upper portion of the front surface 34 may run off more slowly than liquid adhering to the bottom portion of the front lens surface 34. This could result in a thicker coating that takes longer to fully cure on the top portion of the lens' front surface 34, and a thinner, quicker curing coating on the bottom portion. Furthermore, a thicker coating on the top portion of the lens may allow excess liquid to run onto the bottom portion of the lens, causing sags and the like. Another issue that may occur when withdrawing a lens from a liquid bath is that the lens may be withdrawn at such a speed that excess liquid does not drain to the edges of the lens, and instead forms droplets in the middle of the lens. Such dripping from the middle of the lens may cause thicker spots to occur in coatings.

Thus, the control of the interface where the surface of the lens and the surface of the wetting liquid may be advantageously controlled to reduce flaws in the wetting process. For instance, a lens having a high curvature 32, such as that shown in FIG. 1*a*, may be more slowly withdrawn from a wetting liquid when the top portion of the lens emerges from the liquid, and more rapidly when the bottom portion of the lens is removed from the liquid. Such variation of the vertical withdrawal speed may advantageously permit any liquid adhering to the top portion of the lens 32 to drain off the lens into the liquid itself, instead of running over the more rapidly drying bottom portion of the lens, preventing sags or other coating flaws. Additionally, as a further example, a lens 32 may have the bottom portion of the lens removed more slowly to prevent droplets from falling off of the field of the lens, instead of off of the edge. Of course, the actual wetting profile depends on the properties and desired results for a particular lens and/or liquid wetting agent.

Figure 1C:
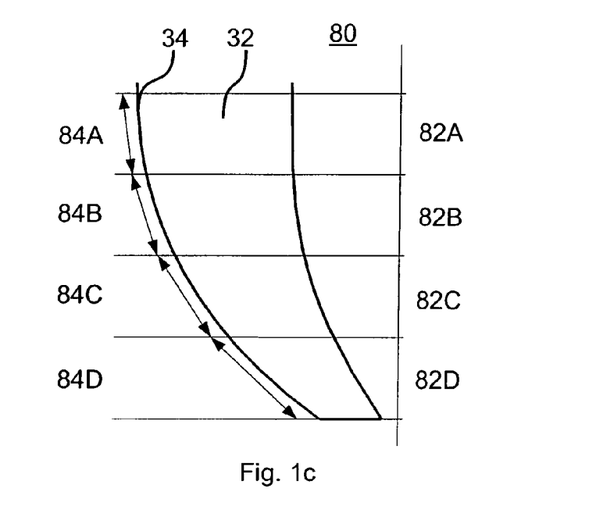
FIG. 1c is an enlarged cross sectional diagram of a lens illustrating the changing vertical surface area of a lens.

FIG. 1*c* depicts an enlarged view 80 of a portion of a highly curved lens 30. When the lens is considered in sections of uniform vertical distance 82A-82D, it can be clearly seen that the vertical surface length 84A-84D of the front lens surface 34 will vary. In particular, it can be seen that for each segment 82A-82D of the lens front surface 34 will have a greater length in the vertical direction based on the geometry of the lens surface 34. With a uniformly curved lens surface, the vertical surface area, or surface length in the vertical direction, may be a function of the tangent of the surface length of section 84A-84D with respect to the section itself 82A-82D. For example, the vertical length 84A of section 82A is significantly shorter than the vertical length 84D of section 82D. This is due to the surface of the lens in section 82D having an average greater angle from vertical than, for example, the vertical length 84A of section 82A. It will be recognized by practitioners skilled in the art of lens coatings, that as the number of sections for a given lens size increases, the size of each section decreases, and as the number of sections approaches infinity, the deviation of the tangent of each section falls to zero, and the sum of approximated surface length for all of the lens sections approaches the actual surface of the lens. Using such approximations, a wetting profile may be generated where a wetting apparatus treats each lens section discretely, or in relation to other lens sections.

In another example, the height of sections 82A-82D could be considered a unit length. For each curved section of the lens 84A-84D there could be assigned an angle at the lower boundary, that represents the degree to which the section 84D tilts away from the vertical, unit height 82D. While surface 84D is curved, a tangent line or average angle (alpha) could be assigned for each section. The cosine of the angle represents the ratio of the unit length to the curved section length, e.g. 82D/84D, which is a value less than one. Assume the lens submersion and withdrawal speed is standardized, for a unit speed for a vertical lens section. The unit speed could be multiplied by the ratio, to give a proportionally slower speed, as the angle, and curved section length 84D increase. For example, unit speed X 82D/84D, or unit speed X cos α. Such a formula could represent the basis of the wetting profile, with adjustments and weighting selectively added to improve coating uniformity. For example, a section in which a sprue (gate) contacts the lens periphery, may require a much slower speed to prevent splashing, or other defects. Similarly, a section containing the ledge of a straight top bifocal, may require a much slower speed to allow for coating to cohesively run off the ledge. The inspection step may be configured to identify defects by section, i.e. 84B or 84D, with a corrective speed then being prescribed for that section alone. This may prevent one corrective action from negatively impacting other sections, by limiting changes only to the sections with identifiable defects.

Control of the interface where the surface or the wetting solution contacts the surface of the lens, hereinafter, the "interface", is key to ensuring uniform and defect free optical lens wetting. Preferably, the lens may be wetted with the surface wetting solution moving along the lens surface 34 at a controlled rate. However, in certain embodiments, the lens may be moved into or out of a wetting solution in a vertical direction, and therefore, the vertical movement speed of the lens may advantageously be adjusted to provide wetting solution surface to lens surface interface that moves along the lens surface at a desired speed. Thus, the vertical speed of a lens as it moves into or out of a wetting solution may be varied as a function of the lens surface geometry. In one useful embodiment, a basic wetting profile may be where the liquid-lens interface moves across the surface of the lens at a linear speed. Such linear speed across the lens may include a vertical movement that varies to cause a constant movement rate of the lens-liquid interface across the face of the lens.

Ideally, to achieve a linear interface speed across the surface of a curved lens, the vertical speed will vary with the angle of the lens where it contacts the interface. Higher angles, where the lens surface is farther from the vertical, generally call for slower movement, with shallower angles, where the instantaneous lens angle, or the angle of the lens where the interface contacts the lens surface, is closer to vertical, will necessitate a higher vertical speed. For instance, in order to achieve a linear interface movement, the lens may be submersed in the wetting solution more slowly when the interface is at the upper and lower sections of the lens, and more quickly when the interface is at the center sections of the lens. Thus, the interface would have more time to move across the greater vertical surface area of the upper and lower sections of the lens, and less time to move across the shorter vertical surface area of the center sections of the lens.

Additionally, the function controlling vertical movement speed of the lens may be weighted in any part to control for conditions that may affect the wetting process. For example, in one useful embodiment, the wetting profile may have a correction factor accounting for gravity, where the top sections of a lens are moved through the liquid-lens interface more quickly or slowly than the bottom sections of a lens. In such a situation, the wetting solution may tend to pool on the upper sections of the lens that are flatter, causing the wetting solution to run off of the upper lens sections more slowly than the lower lens sections. Alternatively, the wetting solution may be of a viscosity that the wetting solution runs off of the upper sections of the lens onto the lower sections of the lens, effectively wetting the lower sections of the lens for longer periods. Contact time and the ebb and flow of the liquid interface across the lens can effect coating thickness and quality.

Alternatively, the base function for uniformly wetting a lens may be weighted by a geometric function, which, in turn may depend on the vertical section lens surface length. The base function may also be modified by a trigonometric function, or any other useful function, such as a function of the instantaneous lens surface angle with respect to the vertical.

Figure 2:
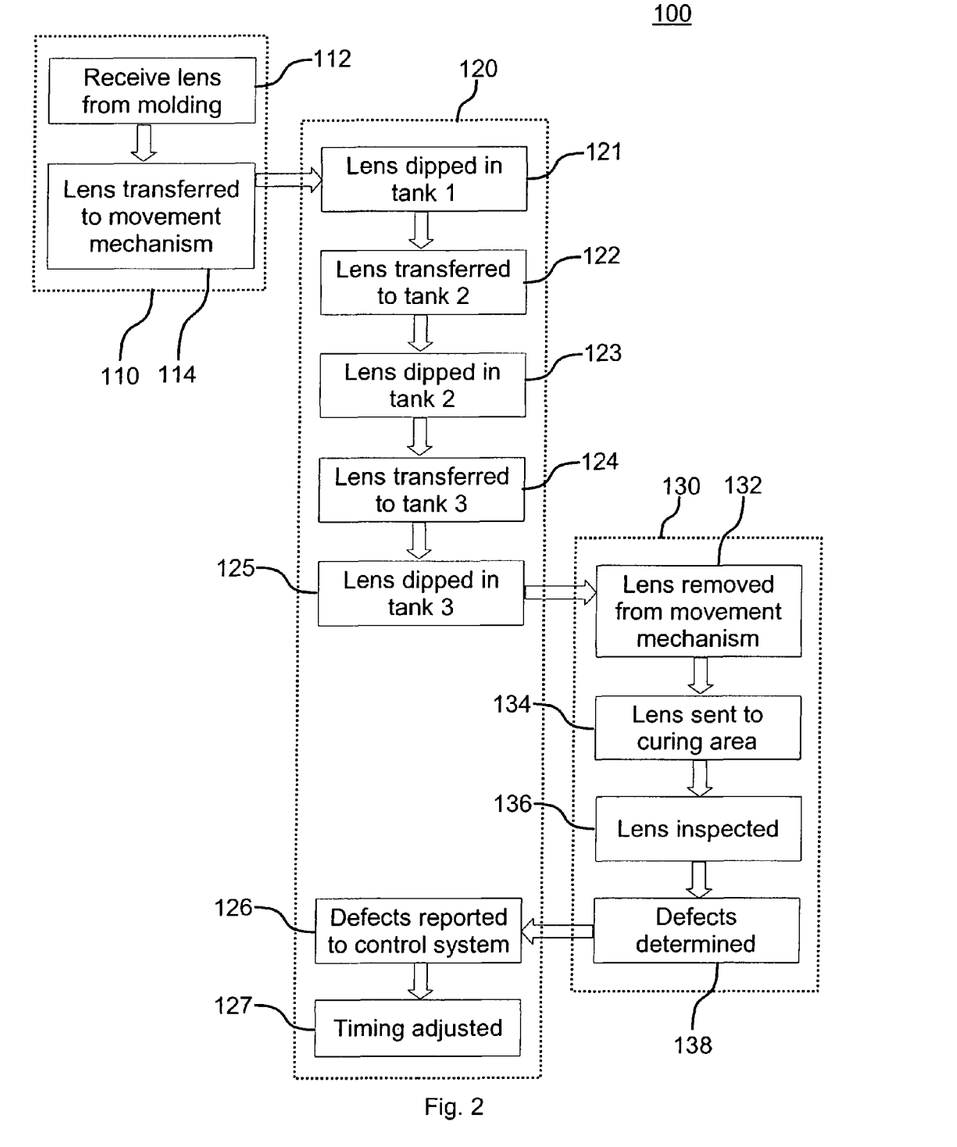
FIG. 2 is a block diagram of an illustrative embodiment of a method for controlling a wetting process.

In FIG. 2, a block diagram of an illustrative embodiment of a system for a method for controlling the wetting of a lens 100 (hereinafter, the method) in accordance with the present principles is depicted.

In the method 100, a lens is received in a lens reception process in block 110. Specifically, a lens enters the method 100 when it is received from molding in block 112. Frequently, lenses are molded in a heated, injection molding environment, and retain some residual heat after being removed from the mold. In one useful embodiment, the lens will be removed from the mold, or de-molded, in a clean room environment, where particulate matter may be closely controlled. In another useful embodiment, the lens may be held for some time to allow for cooling and final hardening of the plastic resins comprising the lens. Additionally, this hold time may be varied to take advantage of the residual heat in the lens, where coatings may be applied more effectively to a warmer or cooler lens surface. After de-molding, the lens may also retain a static charge generated during the molding process in addition to residual heat from the molding process. The aforementioned hold times may, in particularly useful embodiments, comprise part of the wetting profile for a lens, and may be specific to each lens profile, lens series, sub-part of a lens series, or the like. In certain cases, it may be desirable to first contact the lens with a primer very shortly after demolding. Once demolded, polycarbonate lenses begin absorbing moisture. As primers perform better with a dryer lens, it is advantageous to prime those lenses quickly. Better adhesion allows the primer concentration to be lowered, that is, more dilute. Dilute primers are easier to work with and provide better coating results. Lower primer concentrations may also reduce potential contamination sources. In addition, reducing the time to reach the primer improves cycle time.

A lens would then be transferred to a movement mechanism in block 114. One useful embodiment of this transfer may include one or more mechanical arms, or the like, holding, hanging or gripping a purpose built lens holder and using the lens holder to maneuver the lens. The lens holder may advantageously be an integrally molded plastic sprue or cold runner formed during the lens molding process. In an alternative embodiment, a plurality of lenses may be manually placed on a movement mechanism by an operator.

Furthermore, it should be understood that any of the transferring steps, particularly in blocks 114, 122 and 124, may include actions designed to regulate the lens temperature, drying time of coatings, submersion and withdrawal speed of the lenses from the dipping tanks, submersion time of lenses in the tanks, and the like. For instance, in one useful embodiment, lenses may be held during the transfer to the movement mechanism, in block 114, for such a time as to allow the lenses to cool to an advantageous temperature. Alternatively, in another useful embodiment, as lenses are transferred to the movement mechanism in block 114, the lenses may be held at an optimum temperature while preceding lenses are processed through the lens coating system.

The lens may then be passed into the coating process in block 120. Initially in the coating control block 120, the lens would be dipped into a first tank in block 121. In some cases the first tank may contain a cleaning solution. In one preferred embodiment, the first tank may contain a primer, advantageously in liquid form, into which the lens is dipped in block 121. Alternatively, another useful embodiment would be where the first tank contains a first lens coating, or the like, used to prepare the lens surface for coating. In yet another useful embodiment, any static charge or residual heat retained by the lens after the molding process may be dissipated in the first bath by appropriately choosing the solution and temperature.

The lens would then be transferred to a second tank in block 122, dipped in the second tank in block 123, transferred to a third tank in block 124, and dipped in the third tank in block 125. It should be understood that the number and order of the tanks are for illustrative purposes, and that skilled artisans will recognize that a greater or lesser number of dipping tanks may be needed for a particular coating process.

In one particularly useful embodiment, the second tank may contain a coating to be applied to a lens. For example, the lens coating may be a tint, scratch resistant coating, antireflective coating, filter coating, or any other useful coating or bath.

In another useful embodiment, the third tank may contain a solvent or other bath for finishing the coating applied in any of the previous tanks. For example, the tank may contain a solvent for diluting or removing excess coating, and may be used to modify any coating previously applied.

Alternatively, the third tank may include a fixative or sealer for the coatings previously applied. In yet another useful embodiment, lenses may be dipped into the third tank containing a varnish or sealer that may act as a scratch resistant coating over any previously applied tint or filter coating.

Additionally, while transferring the lenses between tanks in blocks 122 and 124, the lenses may be held for a time to facilitate coating runoff and drying between coating steps. Furthermore, the transfer between coating tanks may be accomplished simply by moving the lens via a single manipulator to the appropriate coating tank, or the lens may be transferred to a separate manipulator associated with a particular coating tank.

The lens then enters the curing and inspection process in block 130. In the curing and inspection process, block 130, the lens is removed from the movement mechanism in block 132, and sent to the curing area in block 134. In one particularly useful embodiment, a manipulator may place the lens directly onto a rack for final curing, or place the lens on a separate mechanism for transport to a curing area. Alternately, another useful embodiment may include a user manually removing the lens from the movement mechanism and placing the lens in a curing area.

Preferably, the lens will be held for curing in an area with a high degree of cleanliness, e.g. a clean room environment or the like having little airborne particulate matter that may adhere to the coatings prior to curing, which may damage the finished coating.

Additionally, when the lens is sent to the curing area in block 134, the lens may be held in the curing area for a time sufficient for any previously applied coatings to dry to an acceptable level.

After the lens is sent to the curing area in block 134, the lens is then inspected in block 136. In one useful embodiment, the inspection process is automated, with an inspection module capable of detecting and classifying a range of defects. Alternatively, another useful embodiment may include the inspection process having a user inspecting the finished lens to determine if any defects have occurred in the coating process.

Additionally, the lens inspection of block 136 may include inspection of the lens for defects stemming not just from the coating process, but from any part of the lens forming and coating process. For example, the lens inspection of block 136 may include determining whether any defects are due to the molding process, the handling process the coating process, the curing process, or the like.

After the lens is inspected in block 136, any defects are determined in block 138. Determining defects in block 136 may include determining which, if any, defects are attributable to the coating process, and which are attributable to factors or steps of the overall process unrelated to the coating process. Any defects attributed to the coating system are then reported to the control system in block 126 for consideration during succeeding lens coating steps.

The timing of the coating process in block 120 may then be adjusted in block 127. In one useful embodiment, the timing scheme used in the coating process may be modified to accommodate for or correct any defects that have occurred. The timing adjustments in block 127 may be adjustments to any controllable parameter of the method of controlling the dip coating of a lens 100.

Figure 3:
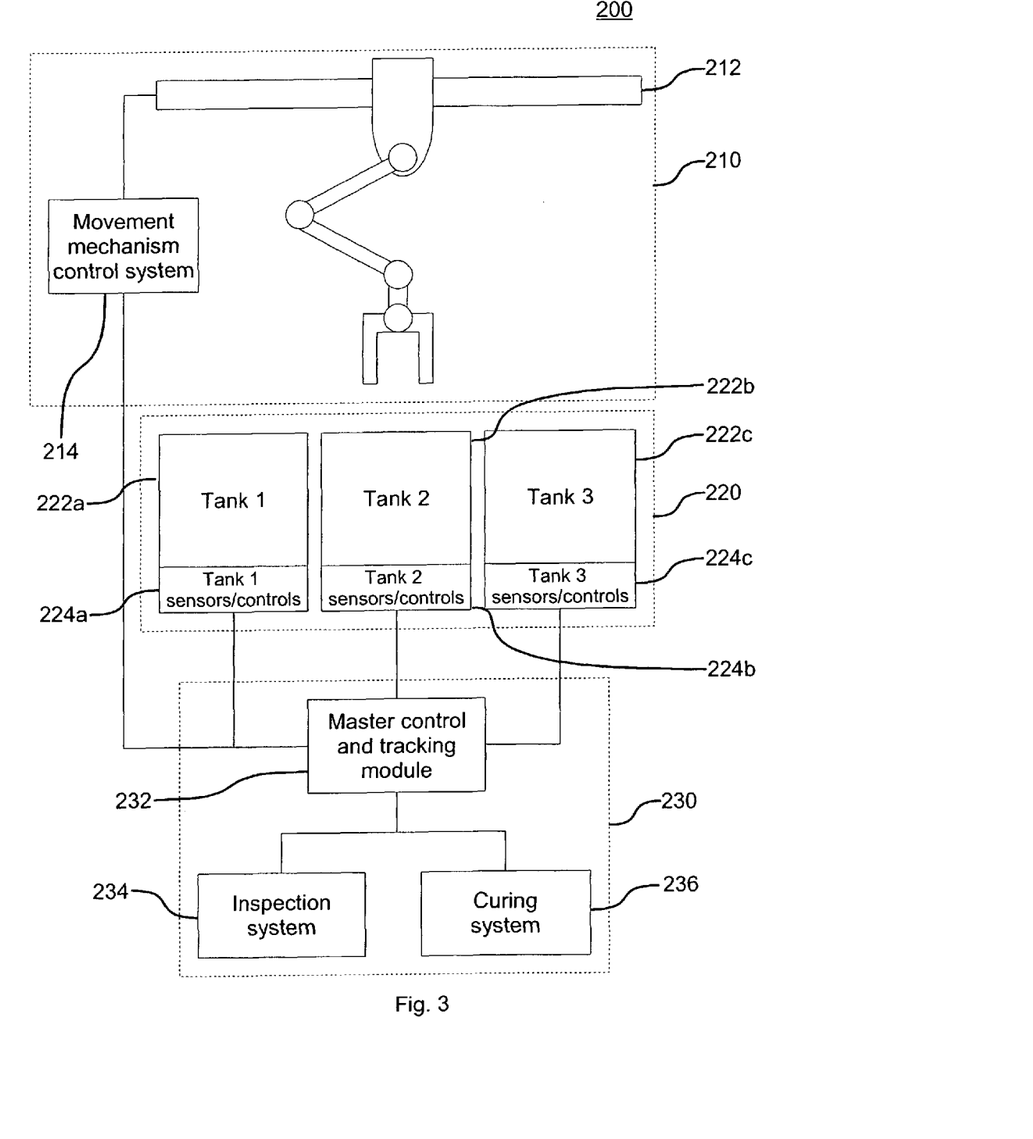
FIG. 3 is block diagram of an illustrative embodiment of an automated wetting system according to the present principles.

Referring now to FIG. 3, a block diagram of an illustrative embodiment of the automated dip coating system 200 (hereinafter, the system) is presented. The system 200 may include at least one automated wetting mechanism module 210, which itself may be comprised of a wetting mechanism control system module 214 and at least one manipulator module 212.

In one preferred embodiment, the manipulator modules 212 may be configured to accept a lens arrangement where a plurality of lenses are attached to a single sprue, integrally molded hanger tab, lens holder, other lens handling apparatus, any of which may be integrally molded to the lenses, or separate and reusable for multiple passes through the system 200. In one useful embodiment, the manipulator modules 212 may be configured to accept an integrally molded lens hanger that is dimensioned to permit the advantageous handling of the cold runner with attached lenses without interfering with the lenses themselves. Furthermore, the manipulator modules 212 may hold one lens throughout the coating process, with a single manipulator 212 dipping the lens in each tank 222a-222c, and transferring lenses between tanks, before moving the lens to the curing system module 236. In an alternative embodiment, multiple manipulators 212 may be independently acting on multiple lenses, respectively dip coating and transferring lenses as needed. Skilled artisans will recognize that the additional manipulators 212 may be added to the system 200 with little change to the timing characteristics of the lenses as they are being processed. Additionally, with multiple manipulators 212 in use at any given time, and each manipulator 212 manipulating a lens through the entire coating process, additional manipulators 212 may advantageously and easily be included in the system 200 for increased throughput volume.

However, in an alternative, yet equally useful embodiment, each tank 222a-222c may have one or more manipulators 212 associated with the tank, where each lens is transferred between the dipping manipulators 212 for each dipping step. In such an arrangement, each dipping tank 222a-222c may have one or more dipping manipulators that only dip lenses in the particular dipping tank 222a-222c before passing the lens to another manipulator associated with another dipping tank 222a-222c.

The movement mechanism control system module 214 may be electrically connected to the manipulators 212, and may be configured to control the speed that the manipulator modules 212 submerge and withdraw a lens from any of the dipping tanks 222a-222c, the hold time between dipping tanks, and the like.

The system 200 may further include a tank module 220, which may, in turn, be comprised of one or more dipping tanks 222a-222c, and one or more tank sensor/control modules 224a-224c associated with each dipping tank 222a-222c. The dipping tanks 222a-222c may hold liquids useful in the coating of lenses such as tints, scratch resistant coatings, primers, cleaning agents, solvents, neutralizing solutions, and the like. In one particularly useful embodiment, the dipping tank module 220 may be comprised of three dipping tanks, 222a-222c, where the first dipping tank holds a liquid lens coating primer, a second dipping tank 222b holds a lens coating solution, and a third dipping tank 222c holds a solvent.

The manipulator 212 receives a lens, and dips the lens in the first tank 222a at a variable speed, holds the lens fully or partially submerged in the liquid contained in the dipping tanks for a variable time, and withdraws the lens from the dipping tank at a variable speed. Additionally, the manipulator 212 may hold the lens after removal from a tank and prior to dipping in another tank. In one useful embodiment, this hold time will permit any excess coating to run off and allow for a specified drying time. The manipulator 212 may then dip a lens into subsequent tanks 222b-222c, again varying the speed of submersion, submersion time, speed of withdrawal, and hold time between tanks.

In one particularly useful embodiment, a lens with a variable tint, e.g., a tint lighter at the bottom than at the top, may be very slowly dipped into a coating tank 222a-222c holding a tint coating. In such an embodiment, the tint will accrete in heavier amounts on the portion of the lens dipped into the tank longer, resulting in a heavier tint coating. The result would be a darker tint at the part of the lens first dipped into the dipping tank 222a-222c, and a lighter tint on the part of the lens in the tint solution for less time.

Each dipping tank 222a-222c may also have a sensor and control module 224a-224c associated with it. In one advantageous embodiment, the sensor and control modules 224a-224c may be configured to measure the characteristics of an associated dipping tank 222a-222c, and may further be configured to modify or control such characteristics. For instance, the sensor and control modules 224a-224c may be configured to monitor and regulate the temperature, fluid levels, fluid circulation, solution concentrations, and the like, of the liquids contained in the dipping tanks 222a-222c. While the foregoing examples are preferred embodiments of conditions monitored and regulated by the sensor and control modules 224a-224c, the sensor and control unit modules 224a-224c are not merely limited to monitoring and regulating the exemplified conditions, as any condition of the dipping tanks 222a-222c or the contents thereof may be monitored, regulated and adjusted. Furthermore, the sensor and control modules 224a-224c may be configured to automatically manage one or more conditions of the dipping tanks 222a-222c, or the contents thereof, automatically. The system 200 may further include a defect management and correction module 230, which may be comprised of a master control and tracking module, 232, an inspection system module 234, and a curing system module 236. The master control and tracking module 232 may be communicatively connected to the wetting control mechanism 214, the tank sensor and control modules 224a-224c, the inspection system 234 and the curing system module 236. In one useful embodiment, the inspection system 234 and the curing system module 236 may have each an automated conveyance system for moving lenses. For example, the manipulator 212 may deposit a lens onto a moving conveyor belt, or hand the lens off to another manipulator for curing and subsequent inspection. In another useful embodiment, the manipulator 212 may, after wetting or submerging a lens in each dipping tank 222a-222c, move the lens into the curing system module 236, where it is held while curing, and then into the inspection system 234 for inspection.

The curing system module 236 may be configured to handle lenses while the coating on the lenses hardens sufficiently for handling, as discussed above for blocks 132 and 134. The inspection system module 234 may configured to handle inspection of lenses that have completed the coating process in an automated fashion, to receive input from other inspection devices, or from a user manually inspecting lenses and reporting any defects.

The master control and tracking module may have a plurality of wetting profiles, where each wetting profile is comprised of data regarding the timing scheme for coating a particular lens. In one useful embodiment, the wetting profile may include data related to the speed of submersion and withdrawal of a lens into each particular dipping tank 222a-222c, the submersion hold time for a lens in each dipping tank 222a-222c, the hold time between lens submersions in each dipping tank 222a-222c, optimum environmental factors such as temperature and dipping tank 222a-222c solution concentrations, optimum curing times, desirable finished lens characteristics, and the like. Additionally, another particularly useful embodiment may be where the master control and tracking module 232 uses the wetting profile to control the automated wetting mechanism module 210 to conform the manipulator 212 actions to the parameters of the wetting profile. Furthermore, the master control and tracking module 232 may use the wetting profile to control other aspects of the system that may include, but are not limited to, the temperature of liquids contained in the dipping tanks 222a-222c controlled via the tank sensor and control modules 224a-224c, the environmental conditions of the curing system module 236, environmental conditions of the system 200 in general, and the like.

The master control and tracking module 232 may then use the data collected by the inspection system 234 to identify defects related to, and generated by the wetting system 200. The master control and tracking module may then retrieve data indicating the corrective measures to be taken to correct any defects, or any possible defects, and apply those corrective measures to the appropriate elements of the system 200. The master control and tracking module 232 may also be configured to implement one or more corrective measures to eliminate a particular discovered defect, and may monitor the lenses to which the corrective measure was applied to verify that the corrective measure completely or correctly eliminated the defect. In one preferred embodiment, implementing the corrective measures may include modifying an element of the wetting profile to eliminate or prevent defects. Additionally, should the corrective measure applied exacerbate or fail to correct the defect, the master control and tracking module 232 may roll back, or reverse, the applied corrective measure and apply separate corrective measures. The master control and tracking module 232 may thus hold multiple data on defects in memory and apply the appropriate corrective measures serially to eliminate one or more defects. Such application and verification of correction measures may be applied iteratively, and the results records or analyzed to generate new corrective measures or other useful data.

Ideally, the master control and tracking module 232 may be configured to update or control the wetting control mechanism module 214, the dipping tank sensor and control modules 224a-224c, and the curing system module 236. In one useful embodiment, the master control and tracking module 232 may correlate information communicated from the inspection system regarding defects in lenses to the time parameters used during the wetting and curing process. In one preferred embodiment, such correlations made by the master control and tracking program module 232 may be used to determine if defects are out of tolerance, or to predict if defects, while in tolerance, are increasing in frequency or magnitude as an indication of falling out of tolerance at a future point.

In one preferred embodiment, the master control and tracking module 232 may have a plurality of definitions of possible types of defects, and a set of instructions for correcting or preventing defects, where each instruction is correlated to one or more defect definitions, and where the instructions are executable when a defect is detected. In this fashion, the master control and tracking module 232 may control the speed of submersion and withdrawal, the hold times between submersions, the total submersion times, the characteristics of the dipping tanks 222a-222c, the environmental characteristics of the curing system module 236 and the like.

The master control and tracking module 232 may also advantageously update the wetting profile when the inspection system module 234 reports defects to the master control and tracking module 232, or the master control and tracking module 232 may deviate from the wetting profile based on defects and environmental changes occurring in the system 200 based on the nature of the defect.

For instance, the inspection system module 234 may detect that lenses coming through the system 200 have an increasingly thick protective coating. Even if the lenses being inspected at the time have a tint coating that falls within an acceptable thickness range, the master control and tracking module 232 may determine that the last several lenses have had an increasingly thick tint coating, and adjust the wetting profile properties related to the tint coating thickness to prevent further defect from occurring. Specifically, in the instance of a protective coating, the master control and tracking module 232 may cause the wetting control mechanism 214, and subsequently, the manipulator 212, to hold succeeding lenses submerged in the coating for a shorter time period. Alternatively, the master control and tracking module 232 may increase the time a lens stays submerged in a solvent bath, which strips off part of the coating/primer, deceasing the coating thickness or making the primer layer more even. The master control and tracking module 232 may also instruct the tank sensor and control unit 224b associated with the coating tank 222b to raise or lower the temperature of the dipping tank 222b holding the coating solution, lowering the viscosity or adherent properties of the solution, and causing the coating to form a thinner layer on the lens. In addition, any other defects may be corrected by manipulating the timing and environmental conditions for each of the steps in the process in a like manner.

Previously, coating systems used manual or semi-automatic controls to vary vertical dipcoating speed. For example, to increase the dipping or withdrawal speed, the vertical speed of the arm would be changed from 3 cm/sec. to 4 cm/sec. As explained above in connection with FIG. 1c, a constant arm speed results in a varying liquid-lens interface speed. The present system utilizes a varying arm speed to obtain a generally constant liquid-lens interface speed. Since the system is already based on different speeds for different lens sections, a coating imperfection on section 84B can be corrected without altering the wetting profile for the other sections of the lens.

In other words, by controlling dip speed for discrete lens sections, the arm speed becomes slaved to the lens surface slope and liquid-lens interface speed. We refer to this collectively as the "wetting profile". Aside from initial overall coating consistency, the incremental speed control allows sections of the lens and coatings to be adjusted independently of other sections. This system reduces the likelihood of having new unrelated defects arise in response to a dip speed change.

Alternatively, the master control and tracking module 232 may advantageously execute a new wetting profile in response to a change in lenses, lens families, lens geometries, base curves or range of base curves that are passing through the system 200. In another useful embodiment, the wetting profile may have a specific incremental exposure profile specific to different lenses, different lens features, different lens geometries, different base curves and/or different ranges of base curves. The master control and tracking module 232 may initiate a change in the wetting profile in response to a signal from other elements of the system 200, from a user, or from any other source, that the lenses entering the system 200 have changed. For instance, the master control and tracking module 232 may modify or change the wetting profile in response to a different lens signal, a different lens feature signal, a different lens geometry signal, a different base curve signal, or a signal indicating a change in the range of base curves.

Furthermore, the master control and tracking module 232 may be configured to notify an outside system, user, or other connected module that defects not related to the coating and curing process are occurring, which would allow correction of the defects in other portions of the lens making process. In one useful example, should the inspection system module 234 detect that cracks exists in many of the finished lenses, the inspection system module 234 may communication to the master control and tracking module 232 the nature of the defect, wherein the master control and tracking module 232 may determine that the cracks in the lens are a physical defect unrelated to the coating and curing process. The master control and tracking module 232 may then notify the lens production line that physical defects are being produced in the lenses.

The master control and tracking module 232 may also track each lens as it makes it way thought the system 200. The time spent processing the lens through various tanks, transferring and holding between tanks, and curing the lens coating is such that new lenses are already in process before one lens has made its way though the entire system 200. In such a case, any adjustments made to correct current or predicted defects will not be verifiable immediately. In one useful embodiment, the master control and tracking module 232 may track lenses as they are processed through the system 200, and may correlate any changes made to the timing or environment of the system parameters to the defects in the lenses, or lack thereof, for which the changes were initiated. For example, where the inspection system module 234 determines that a lens tint coating on one lens is too thick, and the master control and tracking module 232 determines that a timing change should be made, the master control and tracking module 232 may track that the next lens entering the system 200 is being processed with an altered timing scheme. Therefore, when the lens processed with the alternate timing scheme is inspected, the master control and tracking module 232 may determine whether the timing changes made for that lens were effective in correcting the tint thickness. In this manner, the master control and tracking module may, over time, be able to gather statistics to correlate the corrective actions to the correction of the defect, increasing the accuracy of the corrective actions associated with each defect type.

Figure 4:
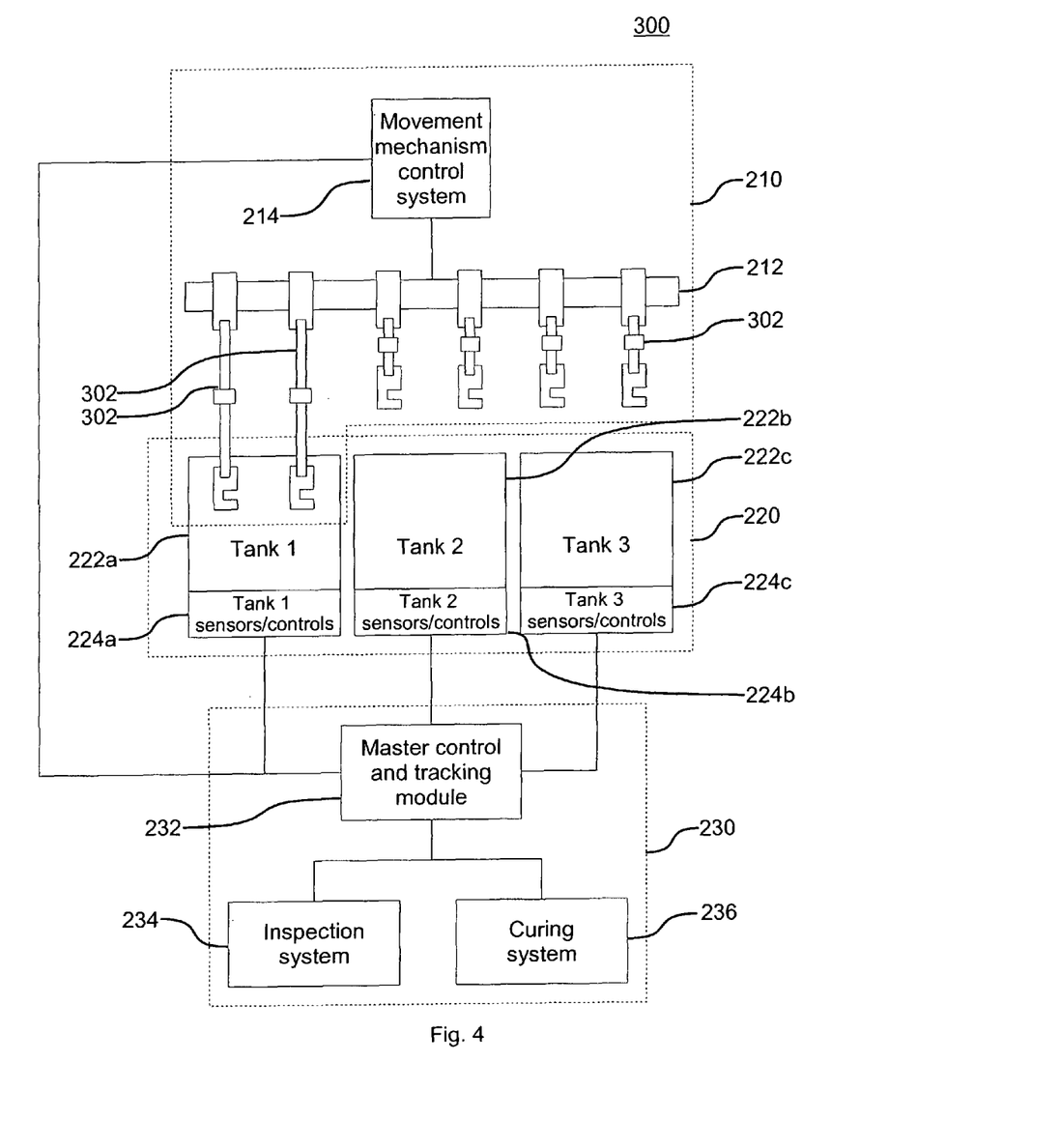
FIG. 4 is block diagram of an illustrative embodiment of an automated wetting system according to the present principles.

Referring now to FIG. 4 a block diagram of an alternative illustrative embodiment of an automated wetting system 300 according to the present principles is depicted. In this advantageous embodiment, the movement mechanism 212 may be a conveyer style mechanism, and may have multiple manipulators 302 configured to each hold a single lens element for all or most of the steps through the process. Additionally, each manipulator 302 may be configured to manually extend to dip a lens into one or more dipping tanks 222a-222c. In this useful embodiment, the movement mechanism 212 may advance the manipulators 302 to place each manipulator over a dipping tank 222a-222c so that each manipulator 302 may independently dip an associated lens into a particular dipping tank 222a-222c.

Figure 5:
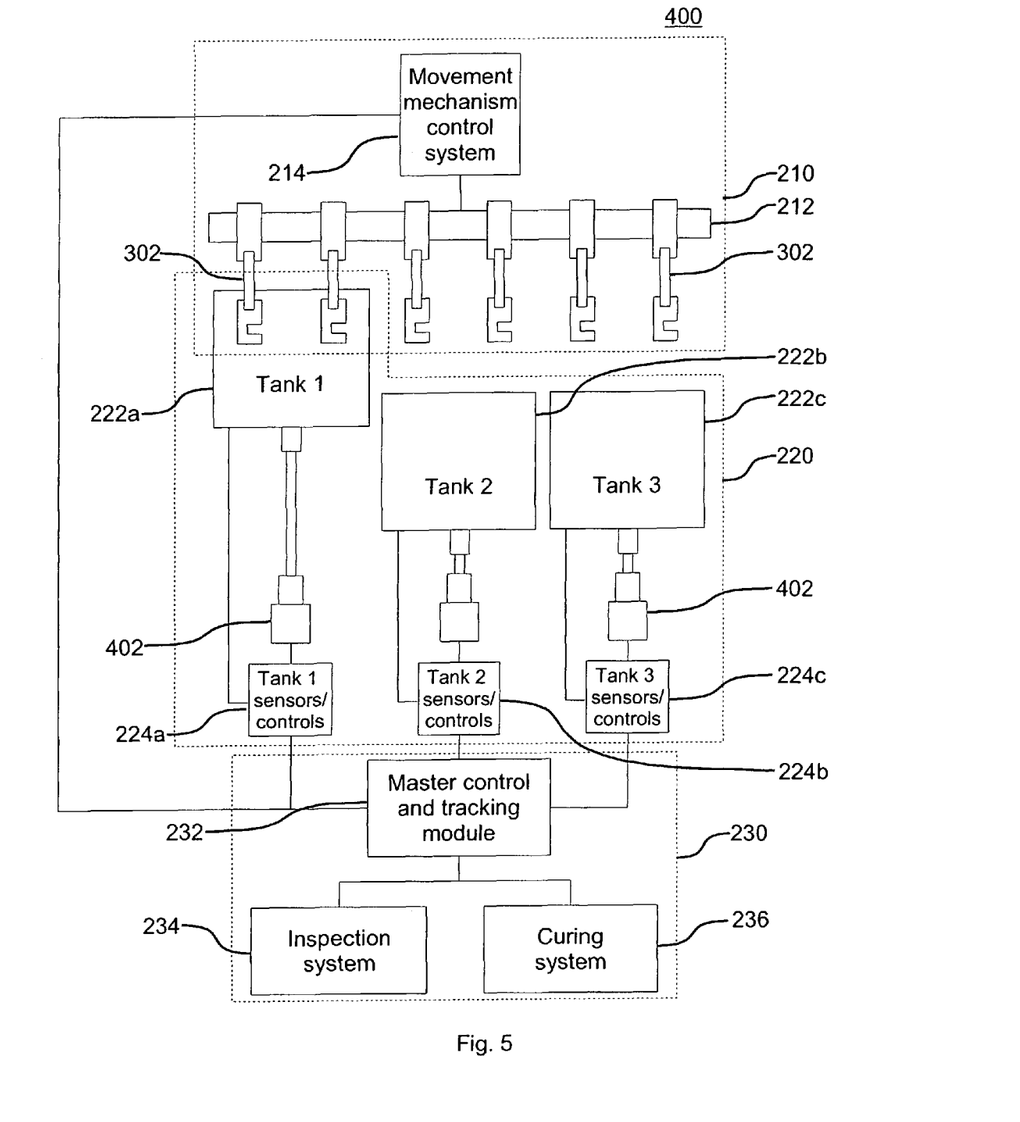
FIG. 5 is block diagram of an illustrative embodiment of an automated wetting system according to the present principles.

FIG. 5 is block diagram of another alternative illustrative embodiment of an automated wetting system according to the present principles. In this embodiment, each lens manipulator 302 may be of fixed length, and attached to a conveyor style movement mechanism 212. Each tank 222a-222c may be attached to a tank jack 402 that raises and lowers each full tank 222a-222c, to immerse each lens on a manipulator 302. In this embodiment, instead of the lens being moved to submerse itself in a liquid contained in a tanks 222a-222c, the tank is moved by the tank jack 402 to wet the lens in the liquid.

In yet another embodiment, either the lens or the tank may be moved to place the lens within the confines of a tank 222a-222c, as shown of FIGS. 4 and 5. However, the tanks 222a-222c may be held empty while the lens is moved into the tank 222a-222c, and the tank 222a-222c subsequently flooded with a desired liquid to submerge the lens. In such an embodiment, the tanks 222a-222c may be drained after the lens within the tank has been submerged in a liquid for the desired time period. The flooding and draining of the tank may be controlled by each tank's associated tank sensors and controls 224a-224c to coat the lens as dictated by each lens' wetting profile.

Having described preferred embodiments a system and method for automated coating and quality control of lens coatings (which are intended to be illustrative and not limiting), it is noted that modifications and variations can be made by persons skilled in the art in light of the above teachings. It is therefore to be understood that changes may be made in the particular embodiments of the present principles disclosed which are within the scope and spirit of the present principles as outlined by the appended claims. Having thus described the present principles with the details and particularity required by the patent laws, what is claimed and desired protected by Letters Patent is set forth in the appended claims.

I claim:

1. An apparatus for wetting and coating ophthalmic lenses, comprising:
    at least one tank adapted to contain a liquid solution;
    a handling system for sequentially moving a lens and the solution in relation to each other; and
    a master control module coupled to said handling system, and configured to control execution of the wetting of the lens in accordance with a wetting profile, wherein the wetting profile comprises data including a submersion speed/acceleration profile and a removal speed/acceleration profile based on the incremental vertical lens surface slope with respect to the surface of the liquid solution and the wetting profile also comprises data for differently varying the withdrawal speed for a top section of the lens based on a correction factor for gravity; and
    wherein said wetting profile comprises instructions to move the lens with respect to the liquid solution to obtain a lens coating with uniform thickness and improved quality.

2. The apparatus of claim 1, wherein the at least one liquid solution is selected from the group consisting of a cleaning solution, a primer solution, a rinse, a coating solution, and a neutralizing solution.

3. The apparatus of claim 1, further comprising an inspection system to provide lens inspection data.

4. The apparatus of claim 3, wherein the master control module is configured to monitor inspection data to identify coating thickness defects related to wetting profile.

5. The apparatus of claim 4, wherein the master control module is further configured to retrieve corrective data corresponding to the identified defects, and alter the wetting profile based on the corrective data.

6. The apparatus of claim 5, wherein the master control module is further configured to track optical lenses according to the altered wetting profile and to assess whether alterations to the wetting profile corrected the identified defects.

7. The apparatus of claim 6, wherein the master control module is further configured to store information regarding the accuracy of the alterations to the wetting profile in relation to the correction of the identified defects.

8. The apparatus of claim 7, wherein the master control module is further configured to incorporate the stored information into successive alterations to the wetting profile.

9. The apparatus of claim 1, wherein the wetting profile comprises:
a waiting period prior to submersion; and
an immersion time.

10. The apparatus of claim 9, wherein the master control module is configured to alter at least one element of the wetting profile, including one of a non-linear submersion speed, and a non-linear removal speed.

11. The apparatus of claim 1, wherein the handling system alters the liquid solution level.

12. The apparatus of claim 11, wherein the handling system alters the liquid solution level as a function of the arc length across the lens surface to provide a more consistent liquid-lens interface speed.

13. The apparatus of claim 10, wherein the wetting profile can alter submersion or removal speed for a discrete lens section.

14. The apparatus of claim 1, wherein the handling system is configured to hold the lens in a stationary position, and wherein the at least one tank is configured to maintain a constant bath liquid level, and to move the tank to submerge the lens according to the wetting profile.

15. The apparatus of claim 1, wherein the handling system is configured to hold a lens in a stationary position relative the position of the tank, and the bath tank is configured to fill with liquid solution to submerge the lens according to the wetting profile.

16. The apparatus of claim 1, further comprising at least two fluid baths, wherein the handling system is further configured to move the lens between fluid baths.

17. The apparatus of claim 1, wherein the wetting profile is based on at least one from a group consisting of a lens, a lens feature, a lens geometry, a base curve, and a range of base curves.

18. A method for submerging optical lenses in a liquid bath, the method comprising the steps of:
placing a lens in a handling system;
controlling execution of at least one wetting profile by a master control module, wherein the wetting profile comprises data including a submersion speed/acceleration profile and a removal speed/acceleration profile based on the incremental vertical lens surface slope with respect to the surface of the liquid solution and the wetting profile also comprises data for differently varying the withdrawal speed for a top section of the lens based on a correction factor for gravity; and
wetting the lens in at least one liquid bath by the lens handling system according to the least one wetting profile which results in lens coating with uniform thickness and improved quality.

19. The method according to claim 18, wherein the method further comprises the step of generating lens inspection data by inspecting the lens.

20. The method according to claim 19, wherein the method further comprises the step of monitoring the lens inspection data for coating thickness defects related to the wetting profile.

21. The method according to claim 20, wherein the method further comprises the step of retrieving corrective data based on the identified defects, and altering the wetting profile based on the corrective data.

22. The method according to claim 21, wherein the method further comprises the step of tracking lenses wetted according to an altered wetting profile, and assessing the effectiveness in correcting identified defects of the alterations to the wetting profile.

23. The method according to claim 22, wherein the method further comprises the step of storing information regarding the effectiveness of alterations to the wetting profile in correcting the identified defects.

24. The method according to claim 23, wherein the method further comprises the step of applying the stored information to successive executions of the wetting profile.

25. The method according to claim 19, wherein the method further comprises the step of monitoring the lens inspection data for molding defects.

26. The method according to claim 25, wherein the method further comprises the step of retrieving corrective data based on the identified defects, and halting execution of the wetting profile until the molding defects are corrected.

27. The method according to claim 18, wherein said wetting step comprises non-linear movement of the lens into the at least one liquid bath in accordance with the at least one wetting profile, wherein the at least one liquid bath is stationary.

28. The method according to claim 18, wherein said wetting step comprises holding a lens stationary and non-linear movement of a bath tank holding a predetermined amount of liquid of the liquid bath to submerge the lens according to the wetting profile.

29. The method according to claim 18, wherein said wetting step comprises holding a lens and a bath tank of the liquid bath stationary, and non-linear flooding of a liquid to submerge the lens according to the wetting profile.

30. The method according to claim 18, wherein said wetting step alters the bath fluid level as a function of an incremental vertical lens surface slope with respect to the surface of the fluid level.

31. The method according to claim 18, wherein said wetting step alters the bath fluid level based on the arc length across the lens surface.

32. The method according to claim 18, wherein the lens retains residual heat from the mold when it first contacts the liquid bath.

33. The method according to claim 18, wherein the lens first contacts a liquid bath containing primer, during a time when the lens is still dry from the mold.

* * * * *